June 23, 1931.　　　C. C. KNAPP　　　1,811,236
SAW FORMING DEVICE
Filed April 11, 1928　　2 Sheets-Sheet 1
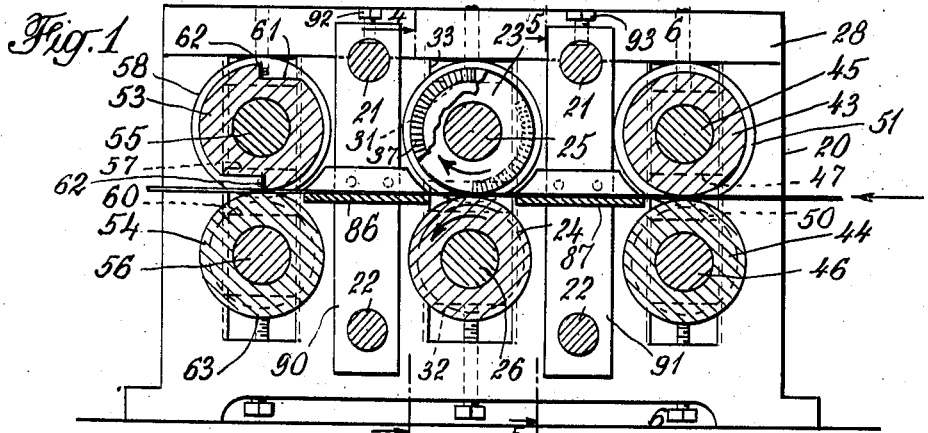
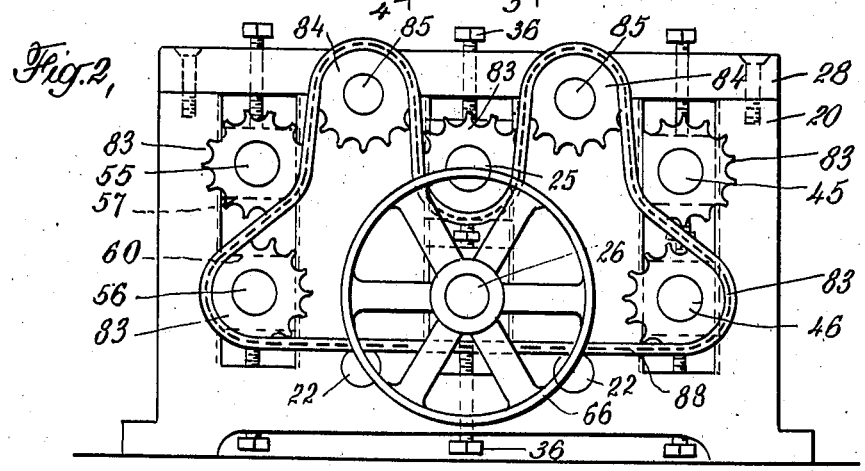
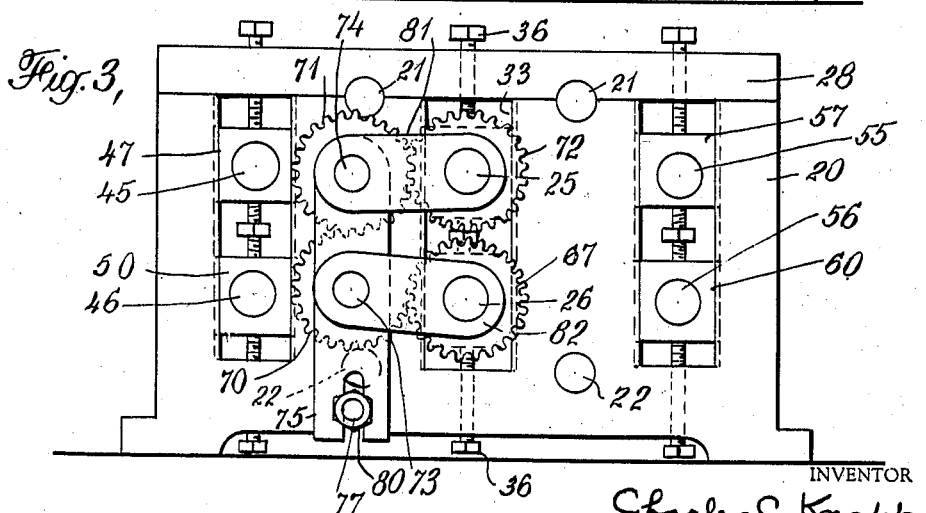
INVENTOR
Charles C. Knapp
BY
Pennie, Davis, Marvin & Edmonds
ATTORNEYS

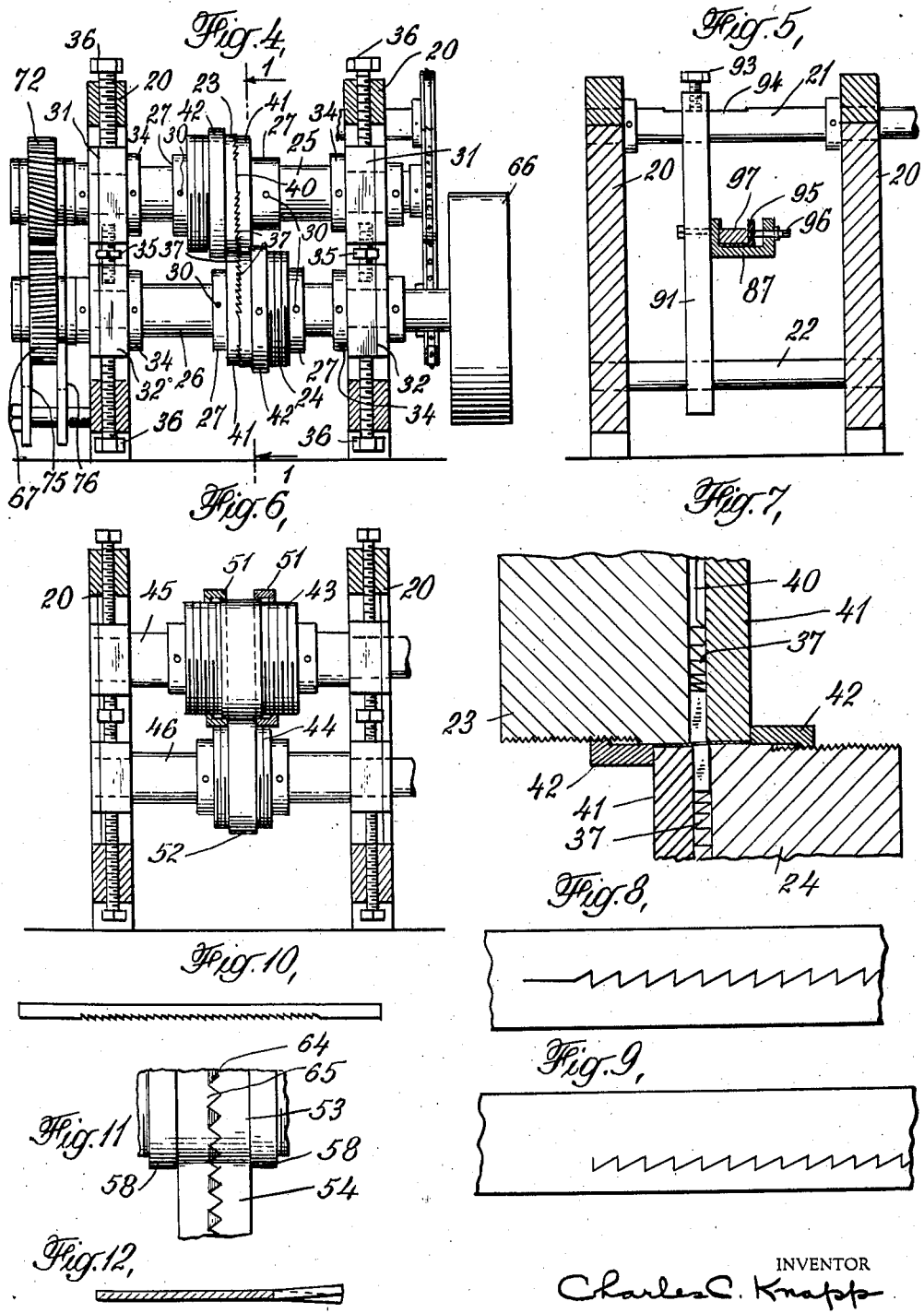

Patented June 23, 1931

1,811,236

UNITED STATES PATENT OFFICE

CHARLES C. KNAPP, OF JERSEY CITY, NEW JERSEY, ASSIGNOR OF ONE-HALF TO ROSWELL B. SMITH, OF BROOKLYN, NEW YORK

SAW FORMING DEVICE

Application filed April 11, 1928. Serial No. 269,141.

This invention relates to the manufacture of saws and has for its object the provision of an improved apparatus and method for manufacturing saws. More particularly, the invention relates to the provision of an improved apparatus for forming jewelers' saws and band saws such as are used, for instance, in scroll cutting.

According to some present practices, saws of the above types are formed by punching the teeth by hand or subjecting a strip of saw stock to the action of grinders, cutters, or punches which rotate about axes which are substantially parallel with the side edges of the strip. According to other present practices, mechanically operated reciprocating dies provided with sufficient teeth to form a complete saw blade are used. It has also been proposed to use apparatus provided with rotary dies having peripheral punches and so mounted that the peripheral punches of one mesh with those of the other.

The methods and apparatus heretofore commonly used have been found to be unsatisfactory for many reasons. In many instances, the apparatus employed is incapable of producing saws having uniform and accurate teeth. In the instances where accurate saws are produced, the capacity of the apparatus is low with the result that the cost of the saws is relatively high. The manufacture of each saw blade or pair of blades according to the present practices, is a relatively slow and tedious process involving several separate and distinct operations, and no apparatus or method by means of which finished saw blades may be formed continuously and accurately from a continuous band of saw stock has been employed heretofore. Furthermore, in the manufacture of saw blades with the present machines and according to the present methods, it is necessary that soft metal saw stock be used, which necessitates subjecting the blades to a hardening process as a result of which the blades become highly brittle and easily breakable.

The present invention contemplates the provision of an improved apparatus by means of which individual saw blades may be continuously and accurately formed from a continuous strip or band of tempered steel. The invention further contemplates the provision of a machine which embodies tooth-forming means, tooth-setting means, and severing means to the end that completely finished saws may be produced by means of a single operation.

Machines embodying the present invention are provided with two superposed circular dies which rotate about spaced parallel axes. The dies are provided on their adjacent end faces with groups of complementary teeth and peripheral cutting edges which cooperate to shear or slit a strip of saw stock longitudinally, and provide two separate strips having spaced groups of teeth. Means are also provided for setting the teeth of the two strips simultaneously and for severing the strips transversely intermediate the groups of teeth. Improved feeding and guiding means are provided for delivering the saw stock to the tooth-forming dies and for delivering the two strips formed by the dies in proper relative positions to the tooth-setting and severing means.

Machines embodying the invention may be provided with dies having teeth formed on their entire adjacent end faces for producing continuous band saws, in which event the severing means and tooth-setting means may be eliminated.

The novel features of the invention will be best understood from the following description taken in conjunction with the accompanying drawings, in which Fig. 1 is a sectional elevation taken substantially on the line 1—1 of Fig. 4 and showing the relative positions of the cutting dies, feed rollers and severing means;

Fig. 2 is a side elevation of the apparatus showing a portion of the driving means;

Fig. 3 is a side elevation showing means for driving the upper die;

Fig. 4 is a sectional elevation taken substantially on the line 4—4 of Fig. 1 and showing the relative positions of the dies;

Fig. 5 is a sectional elevation taken substantially on line 5—5 of Fig. 1 and showing the adjustable guide means for the strip of saw stock;

Fig. 6 is a sectional elevation taken substantially on the line 6—6 of Fig. 1 and showing the feed rollers and the adjustable guiding means mounted thereon;

Fig. 7 is an enlarged fragmentary sectional view of the dies showing the teeth and the peripheral cutting edges for forming the teeth and slitting the strip of saw stock longitudinally; and showing a strip of saw stock being subjected to the cutting action of the teeth;

Fig. 8 shows a fragment of saw stock in which the teeth have been formed midway between the side edges;

Fig. 9 shows a fragment of saw stock in which the teeth have been formed adjacent one side edge;

Fig. 10 shows a completed jeweler's saw formed by the apparatus of the invention;

Fig. 11 is a fragmentary view of the severing rollers provided with tooth-setting means; and Fig. 12 is a transverse section through a jeweler's saw the teeth of which have been set.

Similar reference characters refer to similar parts throughout the several views of the drawings.

The embodiment shown in the drawings comprises a frame formed of two spaced, substantially vertically extending metal plates 20 rigidly connected by means of upper and lower transverse braces 21 and 22.

Upper and lower circular dies 23 and 24 are rigidly mounted upon upper and lower die shafts 25 and 26. Locking collars 27 provided with set screws 30 are mounted upon the shafts 25 and 26 and serve to aid in holding the dies in position on their shafts.

The die shafts 25 and 26 extend transversely between the metal plates 20, and their end portions are journaled in upper and lower rectangular bearing blocks 31 and 32 which are adjustably mounted within rectangular open ended slots 33 in the plates 20. The blocks 31 and 32 are provided with grooves which are adapted to receive the portions of the walls 20 which are immediately adjacent the sides thereof. A member 28 is removably mounted on the top of each plate 20, serving as a closure member for the open ended slots 33 and permitting removal of the die shafts and bearing blocks. Each die shaft is provided with inner and outer thrust collars 34 which engage the inner and outer surfaces of the blocks 31 and 32 and lock the shaft against transverse movement.

The upper and lower bearing blocks 31 and 32 at either side of the apparatus are spaced apart by means of double ended screws 35 having right and left hand threaded end portions which enter threaded recesses in the adjacent end surfaces of the blocks, and they are held in spaced relation to the end walls of the slots 33 by means of screws 36 which extend through vertically extending threaded openings in the portions of the plates 20 and members 28 which constitute the end walls of the slots 33. The die shafts may be moved relatively to each other and to the upper and lower ends of the slots 33, and the dies 23 and 24 may be adjusted relatively to each other through manipulation of the screws 35 and 36.

An end face of each of the dies 23 and 24 is provided with two groups of radial projections or teeth 37 and intermediate grooves. The peripheral surfaces of the projections are flush with the adjacent peripheral surface of the main body portion of the die and correspond in outline and area to a tooth of the saw to be formed. The end surfaces 40 intermediate the groups of projections are plane and extend substantially at right angles to the axes of the die shafts 25 and 26. The surfaces 40 lie in planes which are intermediate parallel planes in which the inner and outer peripheral edges of the teeth 37 lie, and the sum of the distances of the surfaces 40 from either of said parallel planes is substantially equal to the tooth depth.

The axes of the die shafts 25 and 26 are spaced apart a distance substantially equal to the sum of the radii of the dies 23 and 24. The teeth are so formed that those of one die are complementary to those of the other die, and the dies are so mounted relatively to each other that all of the peripheral edge portions of the toothed end of one die cooperate with those of the toothed end of the other die to form shearing means for any rigid body which may be passed between the dies during their rotation.

Strip supporting rings 41 are mounted on the die shafts in contact with the toothed ends of the dies. These rings preferably have radii which are shorter than the radii of the dies with which they are associated by an amount equal to the thickness of the saw stock to be used. Guide rings 42 are mounted on the peripheral surfaces of the main body portions of the dies in threaded engagement therewith, and they may be adjusted to accommodate different widths of saw stock.

Upper and lower feed rollers 43 and 44 (Figs. 1 and 6) are rigidly mounted upon parallel shafts 45 and 46 which extend between the plates 20 adjacent an end of the supporting frame. The feed roller shafts 45 and 46 extend parallel with the die shafts 25 and 26 and their end portions are mounted in bearing blocks 47 and 50 similar to the bearing blocks 31 and 32 in which the end portions of the die shafts as mounted.

The opposite end portions of the upper feed roller 43 are threaded, and the central portion has a smooth surface and is of slightly greater diameter than the end portions (Fig. 6). Guide rings 51 each having an inwardly projecting, threaded, annular shoulder are adjustably mounted upon the threaded end portions of the roller 43. Portions of the guide rings 51 project over the central portion of the roller 43 and form a channel for the strip of saw stock.

The lower feed roller 44 has reduced end portions and an enlarged central portion 52 having a smooth surface and of a width preferably equal to the width of the narrowest strip of saw stock which it will be desirable to use in making saws. The peripheral edge portion of the central portion 52 is normally positioned between the guide rings 51. The surfaces of the central portions of the upper and lower guide rollers 43 and 44 are normally spaced apart a distance equal to the thickness of the strip of saw stock.

The apparatus is provided with a severing and tooth-setting mechanism comprising upper and lower rollers 53 and 54 (Figs. 1 and 11) which are rigidly mounted upon shafts 55 and 56. The shafts 55 and 56 extend parallel to the die shafts 25 and 26, and their end portions are mounted in bearing blocks 57 and 60 which are similar to bearings blocks 31 and 32 in which the end portions of the die shafts are mounted. The upper roller 53 is similar to the upper feed roller 43 in that it is provided with threaded end portions and has guide rings 58 similar to the guide rings 51 mounted thereon. The lower roller 54 has an enlarged central portion the peripheral edge portion of which is positioned between the guide rings 58 carried by the upper roller.

The roller 53 is provided with recesses 61 in which are mounted knife blades 62, the cutting edges of which are spaced 180° apart. The roller 54 is provided with grooves or recesses in which are mounted members 63 having grooves for the reception of the cutting edges of the knife blades 62. The portions of the surfaces of the rollers 53 and 54 intermediate the knife blades 62 and the members 63 are provided with depressions and projections 64 and 65 (Fig. 11) which correspond in outline and area with the teeth formed by the dies. The central portions of the surfaces of the rollers 53 and 54 are normally spaced apart a distance equal to the thickness of the saw stock.

The driving means for the dies, feed rollers and the rollers comprising the severing and tooth-setting mechanism comprises a plurality of gears and a chain all of which are driven by means of a pulley 66 rigidly mounted on the lower die shaft 26 adjacent an end thereof and connected to a suitable source of power (not shown).

The rotation of the lower die shaft is transmitted to the upper die shaft by means of a spiral gear 67 rigidly mounted on the end of lower die shaft opposite to that on which the pulley 66 is mounted. The spiral gear 67 operates through the spiral gears 70 and 71 to rotate a spiral gear 72 which is rigidly mounted upon an end portion of the upper die shaft.

The spiral gears 70 and 71 are mounted on short shafts 73 and 74 carried by an adjustable supporting frame comprising side members 75 and 76 having vertically slotted lower end portions adapted to receive a rod 77 which is rigidly mounted upon and projects laterally from a plate 20. The supporting frame is vertically adjustable and it may be locked against vertical movement by means of a nut 80. A link 81 which is pivotally mounted on the shafts 25 and 74 maintains the axes of these two shafts a fixed distance apart. Similarly, a link 82 maintains the shafts 26 and 73 a fixed distance apart.

The ends of the upper die shaft 25, the severing mechanism shafts 55 and 56, and the feed roller shafts 45 and 46 adjacent the end of the lower die shaft on which the drive pulley 66 is mounted are provided with sprockets 83. A flexible silent chain 88 is appropriately mounted upon the sprockets 83 and idler sprockets 84 which are carried by stub shafts 85 appropriately mounted upon a frame plate 20.

Channel members 86 and 87 (Figs. 1 and 5) provide additional means for guiding a strip of saw stock through the machine. The channel members 86 and 87 are rigidly mounted on vertical supporting members 90 and 91 which are mounted for horizontal adjustment on the transverse braces 21 and 22. Locking screws 92 and 93 extend through vertical threaded openings in the upper end portions of the supporting members 90 and 91 and their lower ends are adapted to engage flat surfaces 94 on the braces 21. The channel members are provided with plates 95 swiveled on screws 96 which extend through threaded openings in the side walls of the channels for varying the widths of the channels. A block or cover member 97 is positioned within the channel between the plate 95 and the opposite side wall of the channel and serves as a means for confining the strip of saw stock to the bottom portion of the channel.

In the embodiment shown in the drawings, the rollers are all of the same diameter and the driving mechanism is so arranged that they all rotate at the same rate of speed. The upper and lower rollers are driven in opposite directions. Thus, the effect on a strip of saw stock positioned between the rollers is the same for each set of rollers.

The machine is adapted to produce saws from strips of tempered steel of varying widths and thicknesses and saws of varying widths may be produced from any strip, as illustrated, for instance, in Figs. 8 and 9.

In adjusting the machine to produce saws of the desired type, dies having groups of teeth of the desired number and contour are so mounted that the groups of teeth and intermediate peripheral cutting or shearing edges are disposed in the proper relative positions. The feed rollers are spaced apart a distance substantially equal to the thickness of the strip. Severing and tooth-setting rollers having knife blades of the proper width, and having groups of depressions and projections corresponding in number and outline to the teeth to be produced and of the type to give the desired set are mounted in their proper positions relatively to the dies, and spaced apart a distance substantially equal to the thickness of the strip of saw stock. The guide rings carried by the rollers and dies are adjusted relatively to the teeth of the dies. The plate and cover members 95 and 97 are adjusted to provide guide channels of the proper width and thickness and the supporting members 90 and 91 are adjusted to aline the channels with the inner surfaces of the guide rings.

A strip of saw stock in passing through the machine passes between the feed rollers 43 and 44 in engagement therewith, enters the channel member 87 and passes between the dies 23 and 24. In passing between the dies, the strip is cut in two along a line corresponding to the outline of the peripheral edges of the toothed ends of the dies. Thus the strip is slit longitudinally along alternate straight and zig-zag lines; the zig-zag lines corresponding to the contour of the toothed edge of a saw blade. The supporting rings 41 carried by the dies hold the two strips against the main body portions of the dies and thus prevent twisting or distortion. The supporting rings 41 and guide rings 42 cooperate to prevent separation of the two strips.

The two strips in leaving the dies pass through the channel member 86 which holds them in proper alinement and passes them thus between the rollers comprising the tooth-setting and severing mechanism. The depressions and projections are so arranged that alternate teeth are set oppositely and the knife blades 62 and members 63 are so arranged relatively to the groups of projections and depressions that the strips are severed at the desired points between the groups of teeth.

Of course, it will be understood that dies having teeth formed on their entire adjacent end faces or any suitable number of groups of teeth may be used or not depending upon the type of saw which it is desired to produce.

I claim:—

1. A saw forming device comprising means for slitting a strip of saw stock longitudinally to provide two strips each having spaced groups of saw teeth, means for setting said teeth, means for guiding said strips to said tooth-setting means and for holding said strips in engagement with each other, and means for cutting said strips transversely.

2. Saw forming apparatus comprising a pair of complementary circular dies for forming saw teeth, means for feeding a strip of saw stock to said dies, a pair of complementary circular dies for setting teeth formed by said tooth-forming dies, and means carried by said setting dies for cutting said strip transversely.

3. Saw forming apparatus comprising a pair of complementary circular dies for forming saw teeth, feed rollers for delivering a strip of saw stock to said dies, a pair of complementary circular dies for setting teeth formed by said tooth-forming dies, and means carried by said setting dies for cutting said strip transversely.

4. Saw forming apparatus comprising a pair of complementary circular dies for forming spaced groups of teeth in a strip of saw stock, means for feeding a strip of saw stock to said dies, a pair of complementary circular dies for setting teeth formed by said tooth-forming dies, and means carried by said setting dies for cutting said strip transversely between the groups of teeth formed by said dies.

5. Saw forming apparatus comprising a pair of complementary circular dies for forming spaced groups of teeth in a strip of saw stock, feed rollers for delivering a strip of saw stock to said dies, a pair of complementary circular dies for setting teeth formed by said tooth-forming dies, and means carried by said setting dies for cutting said strip transversely intermediate the groups of teeth formed by said dies.

6. Saw forming apparatus comprising a pair of complementary circular dies for slitting a strip of saw stock longitudinally to form two separate strips each having spaced groups of teeth formed therein, means for feeding a strip of saw stock to said dies, a pair of complementary circular dies for setting teeth formed by said tooth-forming dies, and means carried by said setting dies for cutting said strips transversely between the spaced groups of teeth.

7. A saw forming device comprising means for slitting a strip of saw stock longitudinally to provide two strips each having saw teeth, means for setting said teeth, and means for guiding said strips from the slitting means to the tooth-setting means, said guiding means preventing lateral separation of the two strips and maintaining them with their serrated edges in interfitting engagement during their passage from the slitting means to the setting means.

In testimony whereof I affix my signature.

CHARLES C. KNAPP.